United States Patent [19]

Guanci

[11] 4,342,172

[45] Aug. 3, 1982

[54] ANIMAL TRAP

[76] Inventor: Anthony Guanci, 1928 N. Leamington Ave., Chicago, Ill. 60639

[21] Appl. No.: 211,243

[22] Filed: Nov. 28, 1980

[51] Int. Cl.³ .......................................... A01M 23/18
[52] U.S. Cl. ...................................................... 43/61
[58] Field of Search ...................... 43/60, 61, 81, 81.5, 43/82, 83, 83.5

[56] References Cited

U.S. PATENT DOCUMENTS

| | | | |
|---|---|---|---|
| 2,620,589 | 12/1952 | Jones | 43/61 |
| 2,793,464 | 5/1957 | Bird | 43/61 |
| 3,762,093 | 10/1973 | Rohde | 43/61 |
| 3,834,063 | 9/1974 | Souza | 43/61 |

Primary Examiner—Nicholas P. Godici
Attorney, Agent, or Firm—McWilliams, Mann & Zummer

[57] ABSTRACT

A trap for rodents and the like, for catching them alive, comprising an enclosure of parallelepiped configuration that is open at one end and that includes a floor, an end wall at the other end of the enclosure, opposed spaced apart side walls, a top wall, and a trap door hinged at its top for closing the enclosure open end. A rat trap type device that includes the familiar spring powered striker member and flat base is mounted in the enclosure with the base secured to the floor to have its spring powered striker member swing from its set position adjacent the end wall of the enclosure toward the open end of the enclosure. The trap door has an upstanding arm affixed to same that projects above the enclosure, and a rigid link is articulated between the arm projecting end and the trap device striker member, with the parts being proportioned so that when the trap device is set, the trap door is held open, and when the trap device is released, as by the rodent taking the bait, the spring bias of the striker member slams the trap door shut to capture the animal alive, while the link in the door arm holds the striker member from striking the animal. The enclosure top includes a releasably lockable hinged cover for providing ready access to the interior of the trap for baiting and setting purposes.

8 Claims, 4 Drawing Figures

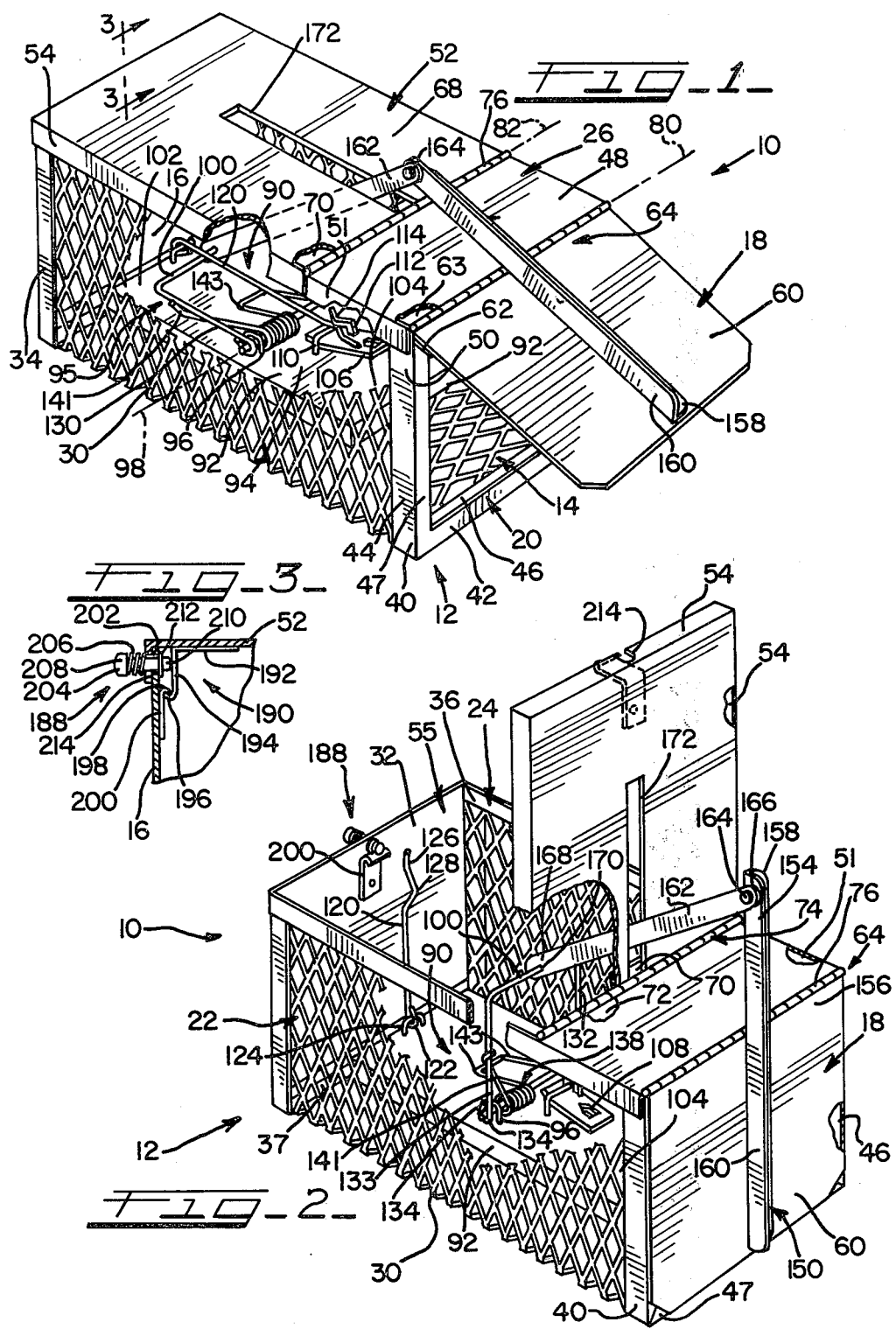

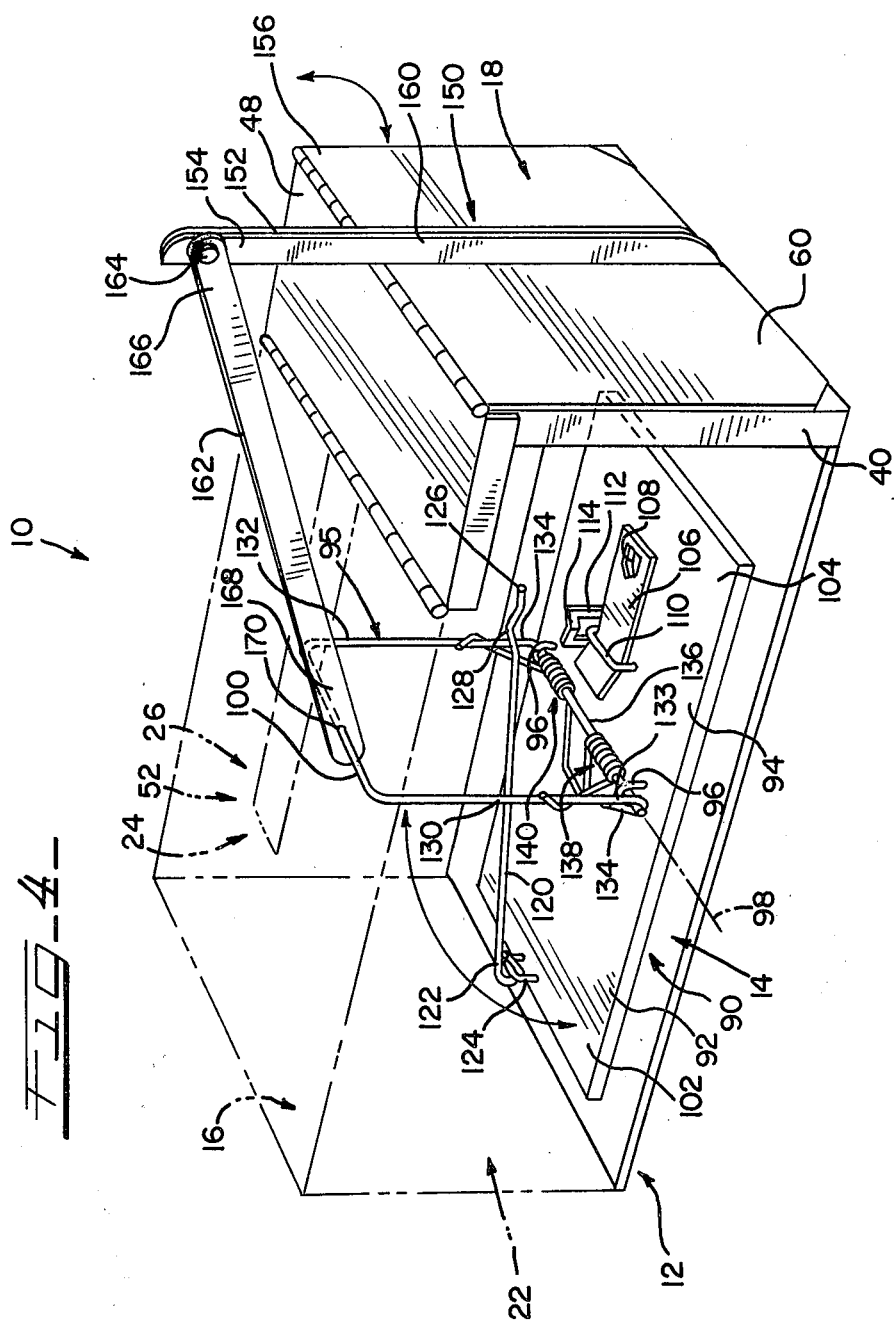

ANIMAL TRAP

This invention relates to an animal trap, and more particularly, to a trap arrangement for catching rodents and the like alive, and for disposing of them without having to touch the animal.

Rat infestation in urban areas, and particularly in factories, institutions, and housing developments, has become a major problem in many areas. Conventional rat traps are designed with the objective of killing the animal when it is trapped. However, where a number of traps of this type have been set up, they must be frequently inspected to remove the trapped animal before its body starts to rot, which in itself is a major problem because of the size of the animal and the filthy condition the animal's body usually is in. Further, removal of such rodents from such traps and disposal of their bodies is a messy, smelly, and unsightly business, and both the setting of the traps and release of the trapped rodents involves the well known risk of injury to and contamination of the trap user.

A principal object of this invention is to provide a trap for rodents and the like that catches the rodent alive, permits it to be killed, where appropriate, by drowning while retained in the trap, and permits the rodent's body to be disposed of in a sanitary manner, and without the user having to touch the rodent.

Another principal object of the invention is to provide a trap for rodents and the like that may be set and released in a manner comparable to conventional snap action rat traps, but which eliminates the risk of user injury that normally is involved in using snap action rat traps.

A further important object of the invention is to provide a trap door type rodent trap assembly in which the conventional snap action rat trap is the basic operating mechanism therefor, in which the trap door is articulated to the rat trap striker arm for safe positioning of same for setting the trap, by moving the door to its open position, and snapping shut the trap door when the animal takes the bait to catch the animal uninjured.

Another important object of the invention is to provide an animal trap that catches the animal uninjured, that permits the animal to be terminated by drowning while remaining in the trap, and that permits the animal body to be removed from the trap and disposed of without having to touch the body.

Still other objects are to provide a trap for rodents and the like that is composed of few and simple parts, that is economical of manufacture, and that is safe, easy and trouble free in use and operation.

In accordance with the invention, a trap assembly for catching rodents and the like alive and uninjured, is provided comprising an enclosure of parallelepiped configuration that is open at one end and that includes a floor, an end wall at the other end of the enclosure, opposed and spaced apart side walls, a top wall, and a trap door hinged at its top to the enclosure for closing the enclosure open end. A snap action rat trap type trap device that includes the familiar spring powered striker member and flat wooden mounting base is mounted in the enclosure by securement to the enclosure floor to have its spring powered striker member swing from its set position adjacent the end wall of the enclosure toward the open end of the enclosure. The trap door has an upstanding arm fixed to same that projects upwardly of the trap door and enclosure, and a rigid link is articulated between the arm projecting end and the trap device striker member, with the parts being proportioned so that when the trap device is set, the trap door is held open, for ready animal access to the trap bait, and when the trap device is released, as by the rodent taking the bait, the power spring of the trap device biases the striker member to slam the trap door shut, to capture the animal alive, while the link and door arm hold the striker member from striking the animal while at the same time affect biasing of the trap door against opening from its closed position. The enclosure top includes a releasably lockable hinged cover that is slotted for the articulating link to pass into the trap, and that opens from the closed end of the trap to provide ready access to the interior of the trap for baiting and trap setting purposes.

Other objects, uses, and advantages will be obvious or become apparent from a consideration of the following written description and the application drawings, in which like references indicate like parts throughout the several views.

In the drawings:

FIG. 1 is a diagrammatic view of one embodiment of the invention as set for rodent trapping purposes;

FIG. 2 is a view similar to that of FIG. 1, but showing the trap in its released relation, with the trap door biased closed, as it would be to trap the animal within the trap, and the trap cover shown in its open position for providing ready access to bait and set the trap;

FIG. 3 is a fragmental vertical sectional view taken substantially along line 3—3 of FIG. 1, illustrating a releasable latching device for latching the cover in its closed position; and FIG. 4 is a diagrammatic, largely schematic perspective view illustrating the principal components of the trap, with parts being shown in outline only.

However, it is to be distinctly understood that the specific drawings provided are supplied primarily to comply with the requirements of the Patent Laws, and that the invention is susceptible of modifications and variations that will be obvious to those skilled in the art, and which are intended to be covered by the appended claims.

Reference numeral 10 of FIGS. 1 and 2 generally indicates an animal trap for rodents and the like arranged in accordance with the invention which comprises enclosure 12 of generally parallelepiped configuration that includes a floor 14, an end wall 16, a trap door 18, enclosure open end 20 that opposes closed end 16, opposed spaced apart side walls 22 and 24, and top wall 26.

In the specific enclosure illustrated, the side walls 22 and the bottom wall 14 are formed from a single sheet 30 of expanded metal shaped to a channel shaped configuration. The end wall 16 is in the form of a sheet metal plate 32 defining side flanges 34 and 36 and bottom flange 37 to which the adjacent edges of the sheet 30 are suitably affixed, as by employing spot welding or the like. The open end of the enclosure 12 is defined by U shaped frame member 40 that is formed to define the bottom or threshold portion 42 having upstanding leg portions 44 and 46 on either side of same; the portions 42 44 and 46 are of angle transverse cross-sectional configuration defining side and bottom flanges comparable to those of plate 32 for securement of the adjacent edges of the sheet 30 thereto (as by spot welding), and frontal flanging 47 against which the trap door 18 abuts in its closed position.

The top wall 26 comprises fixed panel portion 48 that is suitably secured to the U frame 40 at its upper ends 50, and define side flanges 51 on either side of same that are right angled downwardly and fixed to the adjacent portions of the expanded metal sheet 30, as by employing spot welding. Hinged to the fixed panel 48 is cover 52 (that forms the remainder of top wall 26) that is flanged along its sides and projecting end, as at 54 to receive the top edges of the end wall 16 and side walls 20, 22 and 24. Parenthetically, it is pointed out that the right hand side of the assembly 10 duplicates the structural arrangement indicated in the drawings for the left hand side of same, as will be apparent to those skilled in the art. Cover 52 closes top opening 55 of the enclosure 12.

Trap door 18 comprises a panel member 60 suitably hinged to fixed panel 46, as by affixing the panel 60 to one leaf 62 of piano type hinge 64, the other leaf 63 of which is suitably affixed to the underside of fixed sheet 48 (as by employing spot welding). Cover 52 comprises a sheet metal plate 68 that is hinged to fixed sheet 48 in a similar manner, whereby one hinge leaf 70 is affixed by welding to the underside of cover 52 and the other leaf 72 is affixed by welding to the underside of the fixed plate 48, with the leaves 70 and 72 being hinged together in a conventional manner to form piano type hinge 74. As is conventional with piano type hinges 64 and 74, the respective hinge leaves are formed with alternating knuckles 76 receiving suitable pivot pins (not shown) that in the case of the hinges 64 and 74 form the respective hinging axes 80 and 82 that extend transversely of enclosure 12.

Suitably mounted within the enclosure 12 is a familiar form of conventional rat trap device 90, which is illustrated largely diagrammatically, with the details of same being better shown in FIG. 4 in which the enclosure floor 14, end wall 16, side walls 22 and 24, and cover 26 are shown in largely block diagram form or in outline for ease of illustration and to expose parts that might otherwise be covered by overlying parts (as in the showings of FIGS. 1 and 2).

The rat trap device 90 comprises wooden platform or base 92 that is suitably anchored to the floor 14 employing screws or the like or suitable bonding material. The platform or base 92 is of parallelepipe plate like planar configuration defining a top side 94 which bears the familiar operating components of the rat trap device 92, which include the striker member 95 that is pivotally connected to the base 92 by suitable U shaped fasteners 96 for swinging movement about swing axis 98 from a position in which its rodent striking cross bar portion 100 is adjacent the end 102 of platform 92, and thus adjacent enclosure end wall 16, toward the end 104 of the platform 92, adjacent to which the familiar bait mounting member 106 that is formed with the bait receiving prong 108 is pivotally mounted by suitable U shaped fastener 110. The bait mounting member 106 has integral therewith an upstanding flange 112 that includes the familiar keeper portion 114 that is above and aligned with the pivot axis of the bait mounting member 106 as defined by its pivotal mounting member 110. Operably associated with trap device 90 is elongate keeper member 120 having one of its ends 122 suitably swingably anchored to the base 92 by suitable U shaped fastener 124. The other end 126 of the keeper member 120 is formed with indented catch portion 128 which cooperates with the keeper portion 114 of flange 112 to hold the striker member 95 in set position, in the familiar "set" position of the trap device 90 that is diagrammatically illustrated in FIG. 1.

The striker member 95, as in the form shown, comprises the rectilinear striker bar portion 100 and elongate rectilinear legs 130 and 132 of which the leg 130 at its base end 133 is formed in the shape of loop 134, and the leg 132 merges at its base 135 into right angled rectilinear base portion 136, which parallels the striker bar portion 100 and extends under the two fasteners 96, as well as the cooperating torsion springs 138 and 140 that have their respective ends 141 and 143 in the usual spring biasing relation between the base 92 and the respective legs 130 and 132 of the striker member 95.

As is well known, the rat trap devices 90 are set by swinging the keeper member 120 out of the way of the path of movement of the striker member 95, and then moving the striker member 95 to bring its striker bar portion 100 adjacent the base 92 at its end 102, after which the keeper member 120 is brought down over the top of the striker member bar portion 100 and applied to keeper portion 114 of flange 112, after the bait has been applied to the bait mounting member 106, and specifically its prong 108. Under the spring bias of springs 138 and 140, the cath portion 128 of keeper member 120 is biased upwardly against keeper portion 114 of bait mounting member flange 112, through the engagement of the striker member bar portion 100 with member 120 adjacent its end 122; which centers the bait mounting member keeper portion above the pivot axis of member 106, with the keeper member catch portion then being caught under the bait mounting member keeper portion 114 to "set" device 90. The animal in getting at the bait on the keeper member 108 frees the keeper member 120 from the bait member keeper portion 114 so that the torsion spring bias on the striker member 95 snaps it from its held down position adjacent base end 102, toward and against the opposite end 104 of the platform to strike the neck of the rodent or the like and trap it, usually killing the animal.

The present invention is arranged to take advantage of the bait mounting arrangement and the strongly spring biased striker member swinging action of the device 90, and yet provide a trap assembly that effectively traps the animal without injuring it.

In accordance with the invention, as indicated, the trap device 90 is mounted within the enclosure 12, as by having its base 92 suitably secured to floor 14, with the orientation of parts indicated in the drawings so that the base end 102 is adjacent end wall 16 and the other end 104 of the base extends in the direction of the enclosure open end 20. The trap door 18 has elongate angle bar 150 suitably affixed thereto, as by spot welding, employing screw fastening devices, or the like, to define upstanding arm 152 having a projecting end portion 154 which projects well above the top 156 of the panel 60 forming trap door 18. In the form shown, the bar 152 is of angled transverse cross-sectional configuration defining mounting flange 158 and rigifying flange 160, with the flange 158 being suitably welded to the panel 60, secured by suitable screw and nut devices, or the like. At the projecting end 154 of the bar 152, rigid link 162 is pivotally connected thereto by a suitable pin 164 at its end 166, while the other end 168 of link 162 is pivotally connected to the striker bar portion 100 of striker member 95, as by having link 162 apertured as at 170 for this purpose.

As indicated in the drawings, the cover 52 is formed with elongate slot 172 through which link 162 passes from exteriorly of the enclosure 12 through cover 52 for pivotal connection to the striker member striker bar portion 100. Slot 172 is also proportioned lengthwise of cover 52 to accommodate the movement of the trap door 18 and its associated components, namely the leg 162 and the striker member 95, between the "set" position of the rat trap device 90, and the sprung position of the rat trap device in accordance with the invention, that is indicated in FIGS. 2 and 4.

Furthermore, the arm 152 and link 162 are proportioned such that in the set position of the trap assembly 10, and specifically the trap device 90, the trap door 18 is held in its full open position, which, assuming that the trap assembly floor 14 is disposed on a horizontal surface, such as a floor or the ground, would dispose the trap door 18 in a substantially horizontal position; Trap door 18 in its full open position is thus disposed in substantial coplanar relation with enclosure top 26, or at least in flat angled relation thereto so as to permit the animal to be trapped to have full access to the interior of the enclosure 12 without rubbing or brushing against trap door 18. In the sprung relation to the trap assembly 10, the trap door 18 has been snap biased to its closed position of FIGS. 2 and 4, with the striker member 95 being restrained against further swinging movement at a substantially upright position, that preferably approximates a ninety degree angulation with respect to base 92 with the torsion springs 138 and 140 of the rat trap device 90 thus spring biasing the bottom and side margins of the trap door 18 against the frontal flanging 47 of the frame member 40, which thus serves as a movement limiting stop for trap door 18.

Assembly 10 preferably has a suitable latching arrangement to releasably latch cover 52 closed, one suitable form 188 of which is illustrated in FIG. 3, in which cover 52, has an angle bracket 190 suitably secured thereto, as by its flange 192 being suitably spot welded in place, and its other flange 194 being disposed in depending relation and formed with an upwardly angled locking edge 196 that cooperates with a correspondingly angled locking edge 198 of latch member 200 suitably affixed to end wall 16 by spot welding or the like. The plate forming the end wall 16 is suitably apertured as at 202 to mount release member 204 that is biased by compression spring 206 acting between wall 16 and its outer end 208 to a retracted position that is shown in FIG. 3, with the other end 210 of member 204 being disposed for pressing against the flange 194 to push same to free locking edge 196 from locking edge 198 for purposes of opening the cover and swinging it to the open position shown in FIG. 2. The cover is closed by swinging same downwardly whereby locking edge 196 cams by the latching member 204 and locking edge 198 into its locking position shown in FIG. 3. Release member 204 is suitably slidably held in its mounted position, as by employing suitable lock ring 212. The cover end flange 54 is suitably notched as at 214 to receive release member 204.

To set the assembly 10, assuming that rats are to be trapped by the assembly 10, suitable bait, such as cheese or sausage is applied to the bait mounting member 106 and specifically its prong 108. Assuming that the assembly 10 trap is taken to the position in which it is to be located when set, the user than may place the trap on the floor or the like of the space involved, as by, for instance, placing the assembly 10 so that its floor 14 rests on the space floor surface involved. Cove 52 is opened both for the purpose of baiting the bait mounting member 106 and for setting the trap, and for this purpose the cover 52 is swung at least to the position of FIG. 2. To bait the trap device 90, it is convenient to rest the cover against end portion 154 of arm 152. To set the trap device, the keeper member 120 is raised upwardly and the striker member 95 is swung to the left of FIGS. 1, 2 and 4 to dispose its striker bar portion 100 sufficiently adjacent base 92 that keeper member 120 may be applied over same and its end 126 applied in the usual latching relation to keeper portion 114 of flange 112. To achieve this movement, the user may grasp with one hand (say the right hand) the upstanding portion of bar 152 that projects above the assembly top 26, and using this as a handle, force the link 162 and thus the striker member 95 to the left of FIGS. 1, 2 and 4. The user's other hand (for instance, the left hand) is inserted into enclosure 12 through the enclosure top opening 55, adjacent end wall 16, to keep cover 52 open and manipulate the rat trap device keeper member as needed to set device 90, as by applying its portion 128 to the bait mounting portion 114.

When the assembly 10 has been set, the cover 52 is fully returned to its closed position that is illustrated in FIGS. 1 and 3.

The trap assembly 10 now awaits the rat to be trapped, and when the rat is drawn to the trap by the smell of the bait on the bait mounting member 106, the rat will enter, through open end 20, the enclosure 12, which is proportioned lengthwise thereof so that the rat will have to enter substantially its full body length into the enclosure in order to have access to the bait. When the action of the rat taking the bait trips or unsets the rat trap device 90, the striker member 95 is spring powered to thrust the rigid link 162 to the right of FIG. 1, thus thrusting the trap door 18 closed with a snap action that traps the rat inside the enclosure 12. The closing of door 18 also limits the swinging action of striker member 95 toward the animal to no more than the upright position suggested in the drawings, so that the rat is fully protected from the lethal striker member 95, which in accordance with this invention serves only as a spring biased lever for setting device 90 and snap closing trap door 18. While a portion of the rat's tail might be lodged between the closed trap door 18 and the frame member 40, the rat will be essentially uninjured and will readily pull its tail inside the enclosure in reacting to the surprise of being trapped by the assembly 10.

The cover 52 being locked and the trap door 18 being strongly biased to its closed position, the rat remains caged within the assembly 10. The assembly 10, and other similar assemblies applied, for instance, in appropriate places around a factory or a housing development, are to be periodically inspected to determine if the assembly has caught a rat. The rat being largely if not entirely uninjured, will remain living for some days, until the trap is inspected. The expanded metal sheeting 30 providing the side walls and bottom of the assembly 10 provides a foraminous wall or panel construction that avoids suffocation of the animal, and also permits ready termination of the animal by dropping the trap assembly 10 as a whole into a bucket of water or the like to drown the rat. After the rat is terminated, the assembly 10 may be picked up and the trap door 18 opened by grasping the indicted handle portion of bar 152, so that the rat's body can be dropped into a garbage can or a plastic container or the like for hygienic disposure of the rat's remains without the user having to tough the rat.

The assembly 10 may then be reset in the manner indicated for further rat catching purposes.

It will therefore be seen that the invention provides an animal trap assembly that is especially adapted for use in connection with catching alive rodent type animals. The assembly includes the familiar conventional rat trap device that powers the trap assembly trap door and provide for setting of the trap assembly in the usual rat trap device manner. However, the trap assembly when sprung by the animal taking the bait actuates the trap door to catch the animal uninjured so that the problem attendant with the freeing of a rodent from the trap that has been killed by the trap, the practice of which is both unhygenic and messy, are avoided. In the case of rodents such as rats and mice, when such animals have been trapped employing the assembly 10, the animals may be terminated and emptied from the trap without having to touch the animal and conveniently depositing them in sanitary plastic bags or the like for trash disposal use.

In the case of other rodents, or rodent type animals, such as chipmunks, racoons, and the like, where it is desired to trap them for removal to a more appropriate wild life site, the animal will be trapped unharmed and is readily released without touching same by opening the trap door of the assembly, in the manner indicated.

The enclosure of the assembly and associated parts are simple in arrangement and can be secured together employing commonly used spot welding or other fastening techniques. As indicated, the rat trap device 90 may be the conventional rat sized spring powered striker member type of this device, the action of which is modified by incorporating same in the enclosure 12 in the manner indicated to limit the full stroke of the striker member to a position well short of striking relation to the animal being trapped.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a trap for rodents and the like including a trap device that includes an elongated planar base having on its top side a spring powered striker member, a striker bar portion at one end of same extending crosswise of the base and pivotally mounted adjacent the other end of same, intermediate the ends of the base, to swing about an axis extending transversely of the base and spring biased to swing about said axis from a set position in which said striker bar is disposed adjacent one end of the base toward a rodent striking position adjacent the other end of the base, and releasable keeper means for holding said striker member in said set position and including bait mounting means for effecting snap release of same when a rodent pursues the bait, the improvement wherein the trap comprises:

an enclosure having side walling defining an opening and that includes a floor, a top wall, and a trap door for closing the enclosure opening, with the trap device being mounted in said enclosure, and secured to said floor, with said one end of said base extending away from said enclosure opening and the other end of said base extending toward said enclosure opening, and with said base having its top side face upwardly, said enclosure trap door being hinged to said enclosure adjacent the upper end thereof for swinging movement about an axis substantially paralleling said trap device axis between open and closed positions relative to said enclosure open end, said trap door having an arm fixed to same that projects upwardly of said trap door upper end, and a rigid link articulated between said trap door arm and said trap device striker bar portion, said rigid link being proportioned lengthwise thereof such that when said striker member is in its set position said trap door is open and when said trap door is closed said striker member is held by said link in an upright position, said enclosure being apertured to receive said link and accommodates the motion thereof relative to said enclosure following said swinging movement of said striker member.

2. The improvement set forth in claim 1 wherein:

said top wall comprises a cover hinged to said enclosure for swinging movement about an axis paralleling said trap door axis, said cover being formed to define a slot therethrough extending normally of its hinge axis, said cover hinge axis being disposed between said slot and said trap door hinge axis, said slot comprising said aperturing of said enclosure, said cover being swingable about its said hinge axis between a closed position and an open position, whereby when said trap door is in its closed position, said striker member of the trap device may be moved to its set position by swinging said trap door to its open position against said striker member spring bias, and said cover opened for setting said keeper means to hold said striker member in its set position to set the trap device with said trap door held open, and when said keeper means is released, said striker member swings under its spring bias to swing said trap door to its closed position and hold it there under said striker member spring bias.

3. The improvement set forth in claim 2 including:

means for releasably latching said cover in its closed position.

4. The improvement set forth in claim 3 wherein at least a portion of said enclosure is of foraminous construction, whereby when a rodent is trapped in said enclosure, said enclosure may be immersed in water to drown the rodent, after which said trap door may be swung toward said open position thereof to permit gravity discharge of the rodent from said trap.

5. In a trap for rodents and the like including a trap device that includes an elongated planar base having on its top side a spring biased striker member including a striker bar portion at one end of same extending crosswise of the base and pivotally mounted adjacent the other end of same, intermediate the ends of the base, to swing about an axis extending transversely of the base and spring biased to swing about said axis from a set position in which said striker bar is disposed adjacent one end of the base toward a rodent striking position adjacent the other end of the base, and releasable keeper means for holding said striker member in said set position and including bait mounting means for effecting snap release of same when a rodent pursues the bait, the improvement wherein the trap comprises:

an enclosure of generally elongated parallelepiped configuration that is open at one end and that includes a floor, an end wall at the other end of same, opposed spaced apart side walls, a top wall, and a trap door for closing the enclosure open end, with the trap device being mounted in said enclosure between said side walls with said one end of said base being disposed adjacent said enclosure end wall and the other end of said base extending toward said enclosure one end, and with said base being on the enclosure floor with its top side facing upwardly, said base substantially paralleling said enclosure side walls whereby the trap device transverse axis of the trap device striker member extends substantially normally of said enclosure side walls, said enclosure trap door being hinged to said enclosure adjacent the upper end thereof for swinging movement about an axis substantially paralleling said trap device axis between open and closed positions relative to said enclosure open end, said trap door having an arm fixed to same that projects upwardly of said trap door upper end, and a rigid link articulated between said trap door arm and said trap device striker bar portion, said rigid link being proportioned lengthwise thereof such that when said striker member is in its set position said trap door is open and when said trap door is closed said striker member is held by said link in an upright position, said top wall being apertured to receive said link and accommodates the motion thereof relative to said enclosure following said swinging movement of said striker member.

6. The improvement set forth in claim 5 wherein:
said top wall comprises a cover hinged to said enclosure for swinging movement about an axis paralleling said trap door axis,
said cover being formed to define a slot therethrough extending normally of its hinge axis,
said cover hinge axis being disposed between said slot and said trap door hinge axis,
said slot comprising said aperturing of said top wall,
said cover being swingable about its said hinge axis between a closed position and an open position,
whereby when said trap door is in its closed position, said striker member of the trap device may be moved to its set position by swinging said trap door to its open position against said striker member spring bias, and said cover opened for setting said keeper means to hold said striker member in its set position to set the trap device with said trap door held open, and when said keeper means is released, said striker member swings under its spring bias to swing said trap door to its closed position and hold it there under said striker member spring bias.

7. The improvement set forth in claim 5 including:
means for releasably latching said cover in its closed position.

8. The improvement set forth in claim 5 wherein:
said striker member is of quadrilateral configuration including a cross bar portion forming said striker bar portion, and a leg portion at each end of said cross bar portion extending normally of said cross bar portion and pivotally mounted on said base for said swinging movement of said striker member about said swinging axis thereof,
said bait mounting means comprising a bait mounting member pivoted, on said base intermediate said striker member and said base other end, for pivotal movement about an axis paralleling said striker member swinging axis, and including a keeper flange portion disposed over said bait mounting member pivot axis,
said releasable keeper means comprising a hold down member pivotally mounted at one end adjacent said one end of said base and having a catch portion at its other end for releasable underlying engagement with said keeper flange portion,
the spring bias of said striker member being provided by torsion spring means biasing said striker member to swing about its swung axis from a position in which said cross bar portion is adjacent said one end of said base when so held by said hold down member when its catch portion engages said bait mounting member keeper flange, and on release of said hold down member catch portion from said bait mounting member keeper flange toward said other end of said base,
said striker member having a length radially of said swing axis of same for swinging movement free of engagement with said cover.

* * * * *